United States Patent [19]
Friedman et al.

[11] Patent Number: 5,398,120
[45] Date of Patent: Mar. 14, 1995

[54] ORDERED DITHER IMAGE RENDERING WITH NON-LINEAR LUMINANCE DISTRIBUTION PALETTE

[75] Inventors: Steven J. Friedman, Bellevue; Karen A. Hargrove; Joseph M. Joy, both of Redmond; Nathan P. Myhrvold, Bellevue; Sunita Shrivastava, Redmond; Gideon A. Yuval, Mercer Island, all of Wash.

[73] Assignee: Microsoft Corporation, Redmond, Wash.

[21] Appl. No.: 169,576

[22] Filed: Dec. 16, 1993

[51] Int. Cl.⁶ .......................................... G03F 3/08
[52] U.S. Cl. .................... 358/501; 358/504; 358/518; 358/520
[58] Field of Search .............. 358/501, 504, 518, 523, 358/520; 395/131

[56] References Cited

U.S. PATENT DOCUMENTS

| | | | |
|---|---|---|---|
| 4,689,669 | 8/1987 | Hoshino et al. | 345/153 |
| 4,843,379 | 6/1989 | Stansfield | 345/154 |
| 4,907,075 | 3/1990 | Braudaway | 395/131 |
| 4,962,419 | 10/1990 | Hibbard et al. | 358/37 |
| 5,008,739 | 4/1991 | D'Luna et al. | 358/41 |
| 5,068,644 | 11/1991 | Batson et al. | 345/155 |
| 5,130,701 | 7/1992 | White et al. | 345/153 |
| 5,204,665 | 4/1993 | Bollman et al. | 340/703 |
| 5,218,350 | 6/1993 | Bollman | 340/723 |
| 5,233,413 | 8/1993 | Fuchsberger | 358/80 |
| 5,233,684 | 8/1993 | Ulichney | 395/131 |

OTHER PUBLICATIONS

*Digital Halftoning* by Robert Ulichney, Second printing 1988; Chapters 1, 5, 6, and 7.
*Computer Graphics: Principles and Practice* by Foley, van Dam, Feiner, and Hughes, Reprinted with corrections Nov., 1991; Chapter 13.
*Dithering for 12-Bit True-Color Graphics* by Wells, Williamson and Carrie of Sun Microsystems; IEEE Computer Graphics & Applications, Sep. 1991.

*Primary Examiner*—Edward L. Coles, Sr.
*Assistant Examiner*—John Ning
*Attorney, Agent, or Firm*—Klarquist, Sparkman, Campbell, Leigh & Whinston

[57] ABSTRACT

A high color resolution image is accurately approximated with a low resolution image through ordered dithering to colors of a displayable color palette. The colors of the displayable color palette are located at points of a grid aligned with three orthogonal axes in a three dimensional color model, including a luminance axis between black and white. The grid points are defined by the intersections of three sets of parallel planes, each set being perpendicular to one of the three axes. The set of planes perpendicular to the luminance axis are spaced nonuniformly, preferably according to a cubic model. The ordered dithering maps the true color of a pixel in the image to the color in the displayable palette at one of eight adjacent grid points. When ordered dithering of a pixel's true color would map the true color to a grid point outside the color gamut, the pixel is instead mapped to the nearest color on the color gamut's border to the grid point.

13 Claims, 5 Drawing Sheets

ORDERED DITHER IMAGE RENDERING WITH NON-LINEAR LUMINANCE DISTRIBUTION PALETTE

FIELD OF THE INVENTION

This invention relates generally to digital image processing. More particularly, this invention relates to a method and apparatus for accurately approximating a high color resolution or "true color" image on an output device such as a video monitor, printer or the like using a lower color resolution.

BACKGROUND OF THE INVENTION

To accurately represent a color image using digital electronics, the image is quantized to discrete locations and colors. Typically, the image is separated into a two-dimensional array of picture elements or pixels, each of which is assigned a single color. This allows a computer system to represent a color image internally as a two-dimensional array of digital color values stored in a memory. Images represented in this manner are known as bitmapped images because one unit of memory (comprising a group of one or more data bits) is assigned or mapped to each pixel of the image.

The perceived quality of the digitized color image depends upon the color and spatial resolutions at which it is reproduced on an output device. Color resolution is measured by the number of colors that can be simultaneously used, or are "active" in the reproduced image. For example, an IBM-compatible personal computer with a VGA-based display system can simultaneously display 16 colors. A personal computer with a "super" VGA (SVGA)-based display system can display 256 colors simultaneously in an image. Spatial resolution is measured by the number of individual pixels that make up the reproduced image. For example, a computer with a VGA-based display system can display 640 horizontal by 480 vertical pixels (640×480) on screen in its highest graphics mode. Higher spatial resolutions may be achieved with display systems following the SVGA, XGA and other graphics standards. The higher the color and spatial resolutions of the reproduced image, the better its perceived image quality.

Color resolution is equivalently measured by the number of data bits for storing each pixel of the image in a computer's video memory (also known as the bit "depth" of the frame display buffer). The number of colors that can be used simultaneously in a reproduced image is related to the number of data bits mapping to each pixel by the function $2^N$ where N is the number of data bits. Thus, display systems with four bits per pixel can display only 16 simultaneous colors. Which 16 colors (out of the millions possible) are simultaneously displayed depends on the contents of a color look-up table (CLUT) that is addressed by the four-bit color values. The particular set of 16 colors within the look-up table is referred to as a displayable color palette. It is generally possible to switch palettes to emphasize colors tailored to individual images on the display. For example, one color palette may better portray a polar bear in a snowstorm while another palette may better portray a grizzly bear in a forest. As the number of bits per pixel grows from four to eight to twelve, etc., the size of the displayable color palette and the number of simultaneously displayable colors grows exponentially according to the function, $2^N$.

However, application program interfaces provided by operating systems software can often support a much larger number of active colors than supported by VGA, SVGA and other low-bit display standards. The Microsoft ® Windows ™ operating system, for example, supports over 16 million active colors. An application such as a paint program using the Windows ™ operating system can specify 24-bits for each pixel of an image. Typically, the 24-bit value is an RGB (for red, green and blue) value comprising an ordered triple of three eight bit values, one eight bit value in each color dimension of red, green, and blue. The RGB value specifies colors according to the intensities of red, green, and blue (which are additive primary colors) that are mixed to form the color. Each eight bit value represents an intensity level of the respective color between 0 (zero intensity) and 1 (full intensity). Red, for example has an RGB value of (1,0,0) while purple, which is half intensity red and half-intensity blue, has an RGB value of ($\frac{1}{2}$, 0, $\frac{1}{2}$).

The red-green-blue (RGB) color model (which specifies colors with RGB ordered triples as described above) is typically used by computers to quantize colors because it corresponds directly to the range of colors or color gamut that is displayable on a computer monitor. Typical monitors have a set of three phosphors, one red, one green and one blue, at each pixel location on their display. Each pixel on the monitor can display a gamut of colors falling within a three dimensional cube defined by red, green and blue intensities between 0 and 1. Other color quantization models are also used and may be more suitable in certain applications. However, all the color models use a three dimensional representation of the color range, or gamut.

State-of-the-art display systems which go well beyond VGA and SVGA typically have 24 (or more) bits per pixel for displaying about 16.8 million colors simultaneously. They also provide a spatial resolution of 1280×1024 or higher. Such display systems are known as "true color" systems because they allow the actual color to be specified accurately and independently for each pixel. True color systems do not require color look-up tables because the values stored in the screen memory for each pixel directly indicate the color to appear on the screen (e.g. the RGB value specifying the color is itself stored in the screen memory for each pixel). Because the pixel colors are directly indicated by the stored value, the colors are said to be "direct mapped."

However, a major drawback of true color display systems is their cost. They require significantly increased amounts of video memory for a display buffer and may also employ accelerator devices. For desired spatial resolutions of 1024×768 or higher, such systems can cost as much or more than an otherwise state-of-the art personal computer system. True color systems may also perform at slower speeds than 8-bit display systems. It is therefore often desirable to reproduce true color images (or any image stored at high color resolution) using display systems (or other output devices) that use a lower color resolution while maintaining image quality.

In the prior art there have been different approaches taken to provide acceptable quality images without the cost of true color systems. One approach, mentioned above, is to vary the displayable color palette depending on the colors in an image to be displayed. By choosing an optimal selection of colors for a palette, the quality of the reproduced image can be greatly enhanced. One such technique is known as the popularity algorithm. This technique chooses as colors for a palette, those colors which occur most frequently in the image being reproduced. For example, for 8-bit color resolution reproductions, the 256 colors used most frequently in the image are chosen to fill the color palette. When the image is reproduced, each color in the image is mapped to the nearest color in the palette. Usually, the quality of the resulting image is improved since the true color of most of the image's pixels will be in the palette.

Such adaptive palette techniques, however, produce undesirable effects in a windowing environment in which several images may be simultaneously displayed. Since all images on the display use the same palette, adapting the color palette to an individual image on the display generally degrades the quality of the remaining images. Also, when the focus of the windowing environment is subsequently changed to another individual image on the display, the color palette must be re-adapted to that image. Consequently, the quality of the previous image becomes degraded in what is known as a palette war.

A second approach is to truncate the 24 bits per pixel to eight or four bits by simply removing a sufficient number of least significant bits from each color dimension. The problem with truncation is that the color information of the truncated bits is lost. As a result, there is significant difference or error between the color of pixels in the reproduced image from their true color which reduces image quality.

Another approach, known as "ordered dithering," relies on the eye's ability to blend the colors of adjacent pixels over small spatial areas so that an intermediate color is perceived. This approach focuses on replacing or mapping non-displayable colors (those not in the displayable color palette) within defined areas of the image to displayable colors to best simulate the true color when viewed by the human eye. Ordered dithering takes into account additional factors in determining the replacement color, such as the relative location of the pixel being dithered within the image.

Yet another approach is "error diffusion" dithering. Error diffusion is a process for spreading, or diffusing, the error between the true color of a pixel and the displayable color with which it is reproduced to neighboring pixels in the image. Common error diffusion techniques include the Floyd-Steinberg filter, the Stucki filter, and the Burkes filter.

Although prior 4 and 8-bit display systems using these approaches work to some degree, none has proven to be a satisfactory substitute for a true color system. Each produces artifacts, or unwanted visual byproducts, when an image is displayed with a spatial resolution of 60 pixels per inch or greater (640×480 on a 13" monitor or 1024×768 on a 19" monitor). An object of this invention, therefore, is to provide a suitable technique for displaying near true color images using a minimum number of bits per pixel.

SUMMARY OF THE INVENTION

In accordance with the invention, a method and apparatus for accurately approximating a higher color resolution image at a lower color resolution is provided. The invention uses a fixed (non-adaptive) palette comprising a plurality of colors distributed in the form of a grid within a color gamut. The grid comprises a plurality of points defined as the intersections of three sets of parallel planes. The first set of planes is perpendicular to a luminance axis between black and white. The second and third sets of planes are perpendicular to two axes which are orthogonal to the luminance axis and to each other. The spacing between the planes in the first set increases from black to white, preferably according to a cubic model. The palette colors are located at the grid points or intersections of the three sets of parallel planes.

The true or higher resolution color of each pixel in an image being reproduced is mapped to a color in the palette using an ordered dithering process. Each pixel's true color is mapped using ordered dithering to a palette color located at a point of the grid defined by the intersections of the three sets of parallel planes. At times, the ordered dithering process maps true colors near the boundaries of the color gamut to grid points which lie outside the color gamut. Since the colors located at grid points outside the gamut are not displayable, these true colors are mapped instead to the color on the boundary of the color gamut that is nearest to the grid point. Colors on boundaries of the color gamut which are nearest to grid points outside the color gamut to which a true color may be mapped by ordered dithering are also included in the palette.

Additional features and advantages of the invention will be made apparent from the following description of the preferred embodiment, which proceeds with reference to the accompanying drawings.

DETAILED DESCRIPTION OF THE PREFERRED EMBODIMENT

Figure 4:
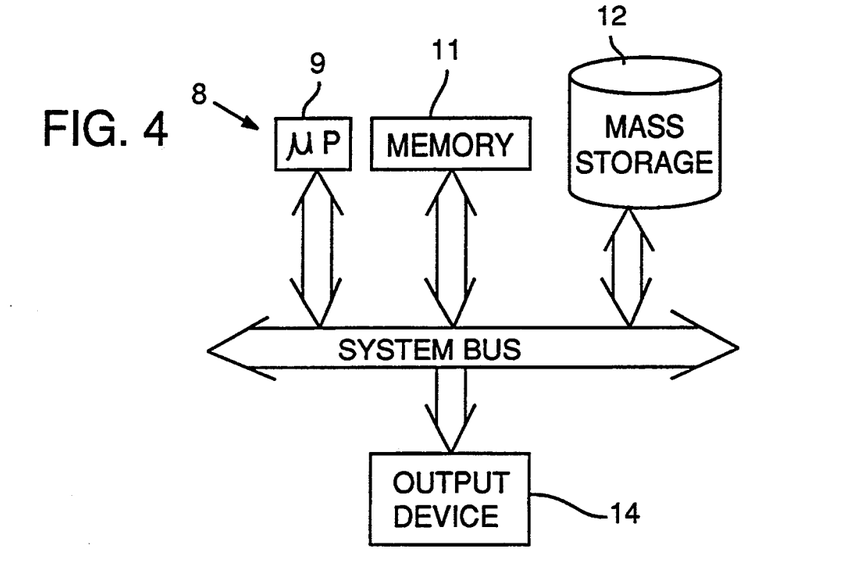
FIG. 4 is a schematic diagram of a computer system used in the preferred embodiment of the invention.

With reference to FIG. 4, the present invention reproduces higher color resolution images at a lower color resolution. In the preferred embodiment, 24-bit per pixel (bpp) or "true color" images are reproduced at a 12-bpp color resolution. The true color image may exist in a computer system 8, such as in an IBM compatible personal computer with an Intel 80×86 family microprocessor 9, as a bitmap comprising a two dimensional array of 24-bit color values, one 24-bit color value for each pixel of the image. In general, the bitmap is stored in the computer's main memory 11 or as a file on a storage device 12. With 24-bit color values, the true color image has an initial palette of nearly 16.8 million colors.

According to the invention, the true color image is reproduced on an output device 14 such as a video monitor, printer or the like using the colors of a displayable color palette (displayable palette). In the preferred embodiment of the invention, the displayable palette comprises a plurality of colors specified by 12-bit values for a total of 4096 simultaneously displayable colors. In other embodiments of the invention, color resolutions other than 24-bpp and 12-bpp can be used for the initial and displayable palettes, respectively.

Figure 1:
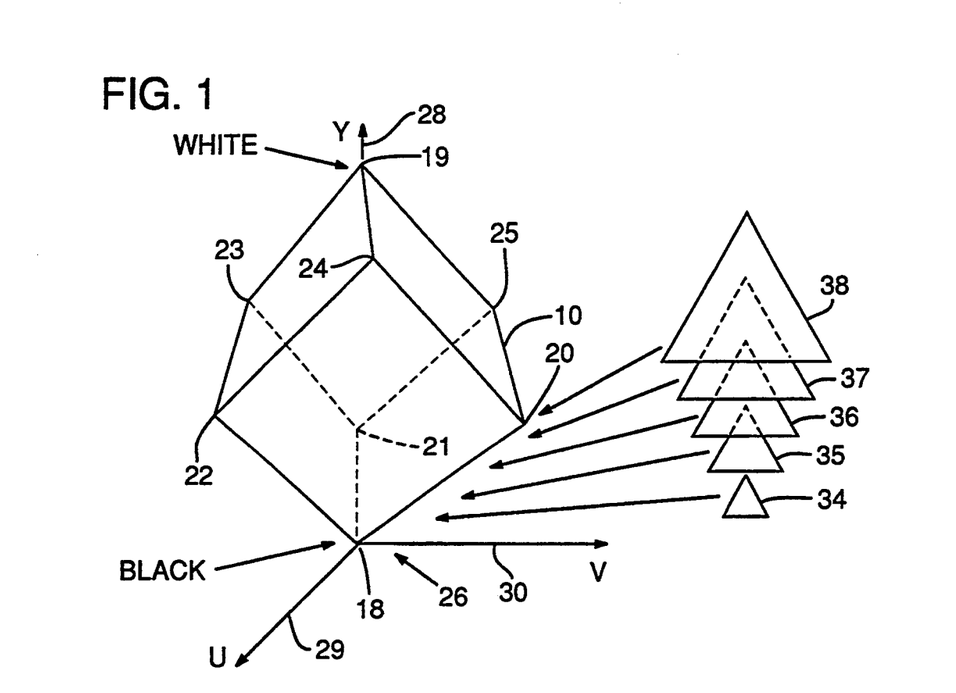
FIG. 1 is a diagram of a color gamut in a YUV color model in which colors of a displayable color palette according to a preferred embodiment of the invention are located.

With reference to FIG. 1, the colors of the displayable palette are distributed in the form of a grid within a color gamut 10 of the output device 14 (FIG. 4). The color gamut 10 is the range of colors displayable on the output device. For a typical video monitor which has red, green and blue phosphors at each pixel location of its screen, the color gamut has the general shape of a cube in a three dimensional color model. The eight vertices of the cube are colors black 18, white 19, red 20, green 21, blue 22, cyan 23, magenta 24 and yellow 25. The colors within the cube are produced by mixtures of various intensities of red, green, and blue light created by illuminating the phosphors of the video monitor such as with an electron gun. The gamut of other output devices sometimes vary from the illustrated gamut, but most often the gamut is substantially identical to that shown. For example, color printers typically produce colors by mixing cyan, magenta, and yellow inks. However, the range of colors (gamut) that can be printed is similar to that of video monitors. The displayable palette of the invention can therefore be made with reference to a typical color gamut broadly applicable to a number of devices, or with reference to the color gamut of a particular output device.

In FIG. 1, the color gamut 10 is illustrated in a YUV color model 26. In the YUV color model 26, colors are specified using an ordered triple or cartesian coordinate describing the color's location with respect to three orthogonal axes 28-30. The three axes include a Y or luminance axis 28, and U and V or chrominance axes 29, 30. (Luminance is an attribute of color related to a color's brightness or darkness. Chrominance is an attribute describing the color apart from its luminance.) The luminance axis 28 is located along a major diagonal of the color gamut 10 between black 18 and white 19. Black 18 has zero luminance and is therefore considered to be located at the origin of the coordinate system. White 19, however, has the maximum luminance and is located at the opposite vertex of the color gamut 10 along the luminance axis 28. On the luminance axis 28 between black 18 and white 19 are grays of various luminances.

The U chrominance axis 29 generally runs in the blue-yellow direction, while the V chrominance axis 30 runs generally in the red-green direction. The direction of a color from the luminance axis is its hue. The color's distance from the luminance axis is its saturation. The U and V components of a color's coordinates specify a location having a unique hue and saturation in terms of the color's displacement from the luminance axis in the directions of their respective chrominance axes.

The grid in which the colors of the displayable palette are distributed is defined by the intersections of three sets of spaced, parallel planes (not shown). A first set comprises a plurality of spaced, parallel planes (luminance planes) which are each perpendicular to the luminance axis 28. In the preferred embodiment of the invention, there are 40 luminance planes in the first set. A first luminance plane intersects the color gamut 10 at black 18. A last luminance plane intersects the color gamut 10 at white 19. Cross-sections 34–37 of the color gamut 10 which are the intersection of other luminance planes with the color gamut are triangular near black 18 and near white 19 and increase in area as the distance of the luminance plane from black 18 or white 19 increases.

The luminance planes in the first set preferably have a non-uniform or non-linear spacing that increases progressively from black 18 to white 19. This has the effect of distributing the displayable palette colors farther apart at high luminances and closer together at low luminances. Such a distribution of displayable palette colors is more effective because the human eye is more sensitive to differences in luminance between colors having lower luminances than between colors having higher luminances. In the preferred embodiment of the invention, a cubic model for distributing the luminance planes is used. More specifically, the luminance planes are perpendicular to the luminance axis 28 at 40 discrete magnitudes of luminance given by the following progression:

$$Y = 0, \left(\frac{1}{N-1}\right)^3, \left(\frac{2}{N-1}\right)^3, \left(\frac{3}{N-1}\right)^3, \ldots, 1 \quad (1)$$

where Y is luminance, N is the number of planes in the first set between black 18 and white 19 inclusive, a zero in luminance is black 18, and a one in luminance is white 19.

A second of the sets of planes comprises a plurality of spaced, parallel planes (U chrominance planes) which are perpendicular to the U chrominance axis 29. Spaced, parallel planes (V chrominance planes) in a third set are perpendicular to the V chrominance axis 30. Alternatively, the second and third sets of planes can be perpendicular to any other orthogonal axes which are both orthogonal to the luminance axis 28. In the preferred embodiment, one of the chrominance planes in each of the second and third sets is coplanar with the luminance axis 28. The remaining chrominance planes in the second and third sets are spaced at uniform intervals along the U and V chrominance axes 29, 30, respectively. Thus, the U and V chrominance planes are located at discrete magnitudes of U and V chrominance, respectively. The luminance and chrominance planes intersect at points in the three dimensional space of the YUV color model 26 which together form the grid at which colors of the displayable palette are located.

Figure 2:
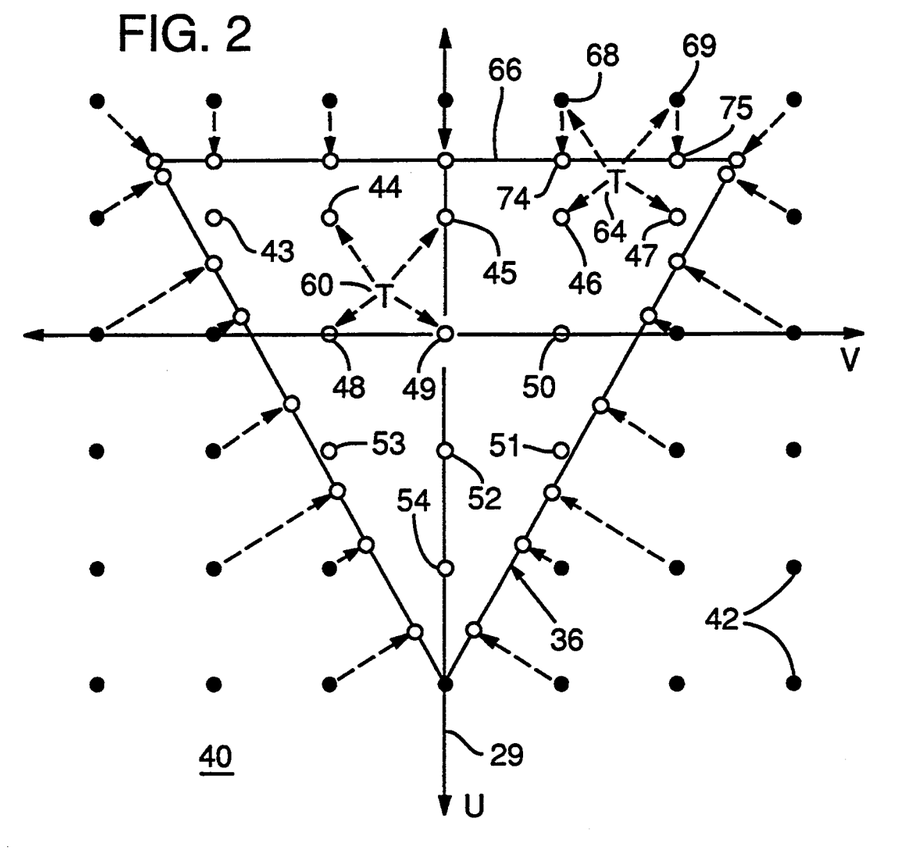
FIG. 2 is a top view of a plane perpendicular to a luminance axis of the YUV color model of FIG. 1 including a cross section of the color gamut and on which some colors in the displayable color palette are located.

Referring to FIG. 2, a twentieth luminance plane 40 is perpendicular to the luminance axis 28 and intersects with the color model 10 (FIG. 1) to form the cross section 36. Each of a plurality of points 42–54 in the shape of a grid are formed by the intersection of the luminance plane 40 with a U chrominance plane and a V chrominance plane. The displayable palette comprises those colors located at the points 43–54 (illustrated with open dots) of the grid that are within the color gamut 10. (The points 43–54 are consequently within the cross section 36 of the color gamut 10.) Likewise, the displayable palette comprises those colors located on other luminance planes at points of the grid formed by the intersections of those luminance planes with a U chrominance plane and a V chrominance plane that are within the color gamut 10.

The spacing between planes in each of the Y, U and V dimensions determines the spacing between grid points in that dimension. Since the displayable palette colors are located at grid points within the color palette, the spacing of the planes in each dimension also determines the spacing between displayable palette colors in that dimension. Since the U and V chrominance planes are spaced uniformly, the displayable palette colors are uniformly spaced in each of the U and V dimensions of the YUV color model. The luminance planes, however, have a non-linear spacing. Therefore, the spacing of the grid points and the displayable palette colors in the Y dimension is also non-linear.

In accordance with the invention, high color resolution images are reproduced using the colors of the displayable palette. As described previously, each pixel of the image has a true color specified by a high color resolution value (a 24-bit color value in the preferred embodiment). When the image is reproduced at the lower color resolution of the displayable palette, a color from the displayable palette will be used for the pixel instead of the pixel's true color. The color used is determined by an ordered dither process which "maps" the pixel's true color to a color in the displayable palette.

The ordered dither process selects a color for a pixel of the image from the displayable palette based on the pixel's true color and position in the image. Using the cartesian coordinates (x,y) of the pixel in the image, a scaling factor is located at the position (x mod 4, y mod 4) in the following preferred threshold matrix:

$$\begin{matrix} 0 & \frac{6}{16} & \frac{9}{16} & \frac{15}{16} \\ \frac{11}{16} & \frac{13}{16} & \frac{2}{16} & \frac{4}{16} \\ \frac{7}{16} & \frac{1}{16} & \frac{14}{16} & \frac{8}{16} \\ \frac{12}{16} & \frac{10}{16} & \frac{5}{16} & \frac{3}{16} \end{matrix}$$

For each of the Y, U and V dimensions of the true color, an amount of dither equal to the scaling factor multiplied by the spacing in that dimension between the magnitudes of grid points adjacent to the true color is added to that dimension of the true color. The sum of the dither and the true color is then truncated in each dimension to the next lower magnitude of the grid points in that dimension. The ordered dither process maps the pixel to the displayable palette color at the grid point located at the truncated magnitudes. This ordered dither process is repeated for each pixel in the image (or part thereof) being reproduced.

For example, for a pixel at (10, 13) in the color image, the scaling factor 1/16 located at (2,1) in the threshold matrix is used. (The rows and columns of the threshold matrix are numbered 0 through 3.) This scaling factor (1/16) is multiplied by the magnitude spacing between the grid points adjacent the pixel's true color in each dimension to determine the amount of dither to add to the true color in that dimension.

Referring to FIG. 2, assuming the pixel's true color is located at a point 60 between the luminance plane 40 and a next higher plane of the first set (whose intersection with the color gamut 10 is the cross section 37), then the dither added in the Y dimension is 1/16 times the spacing in luminance magnitude between the luminance plane 40 and the next higher luminance plane. The dither added to the true color in the U dimension is 1/16 times the spacing in chrominance magnitude between adjacent U chrominance planes (i.e., the spacing between the grid points 45, 49). The dither added in the V dimension is 1/16 times the chrominance magnitude spacing between the adjacent V chrominance planes (i.e., the spacing between the grid points 48, 49). (In the preferred embodiment, the spacing between chrominance planes in the U and V dimensions is uniform and, therefore, will be the same regardless of the true color's location in the color gamut 10. However, the spacing between the luminance planes is non-linear and therefore the spacing between the luminance planes adjacent the true color is dependent on the true color's location in the color gamut.)

Figure 3A:
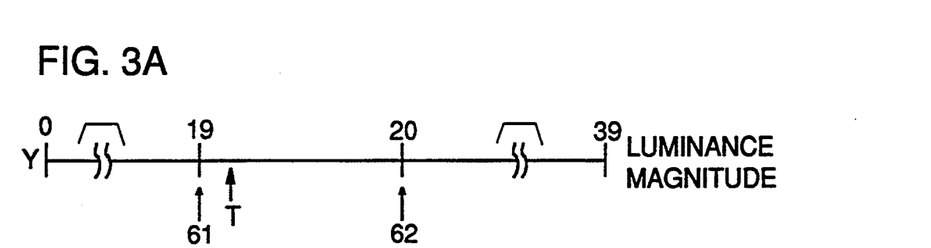
FIGS. 3A–C are illustrations of a dithering technique according to the invention for approximating a pixel's true color with colors of the displayable color palette.
Figure 3B:
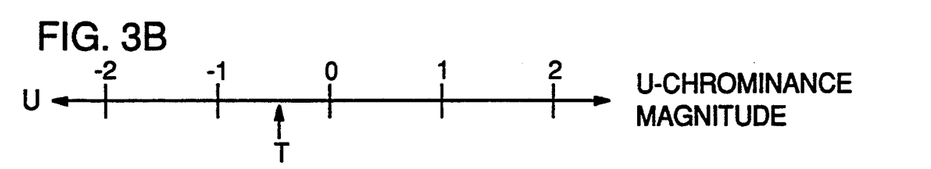
Figure 3C:
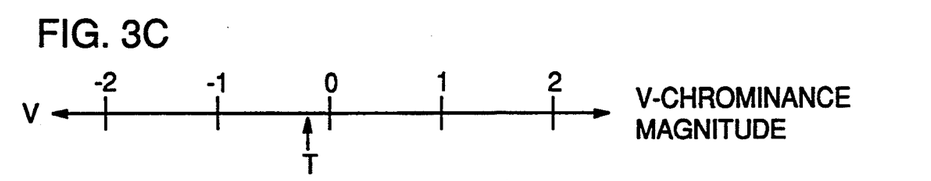

Referring to FIGS. 3A, 3B and 3C, the sum of the true color and the dither is then truncated in each dimension to the next lower discrete magnitude of the grid points in that dimension. In the illustrated displayable palette, there are 40 discrete magnitudes of luminance, one for each luminance plane, at which grid points are located as shown in FIG. 3A. The pixel's true color is located just above the luminance magnitude 61 of the twentieth luminance plane 40 and well below the luminance magnitude 62 of the next higher or twenty-first luminance plane. The sum of the true color and the dither (1/16 times the spacing between the twentieth and twenty-first luminance planes) is still well below the luminance magnitude 62 of the twenty-first luminance plane. When the sum is truncated in the Y dimension, it is truncated to a grid point on the next lower luminance magnitude 61 (that of the twentieth luminance plane 40).

As shown in FIGS. 3B and 3C, there are discrete chrominance magnitudes at which the grid points (and correspondingly the chrominance planes) are located in each of the U and V dimensions. In FIGS. 3B and 3C, the chrominance magnitudes are numbered starting with zero at the origin of the YUV color model 26. The true color 60 is located between the −1 and 0 chrominance magnitudes in each of the U and V dimensions. The sum of the true color and the dither (1/16 times the grid spacing in each dimension) is still between the −1 and 0 chrominance magnitudes in the both the U and V dimensions. Therefore, the sum will be truncated to the next lower grid point at U and V chrominance magnitudes of −1 and −1, respectively. The result of truncating in each of the Y, U and V dimensions is the grid point 44 at the twentieth luminance magnitude and negative one (−1) U and V chrominance magnitudes. Thus, the ordered dither process will result in mapping the pixel to the displayable palette color at the grid point 44.

Referring again to FIG. 2, in general, the ordered dither process maps a pixel to one of eight colors from the displayable palette at the 8 grid points adjacent to the true color of the pixel. For example, the true color located at the point 60 is adjacent to the displayable palette colors located at grid points 44, 45, 48, 49 of the plane 40 and four like grid points on the next higher plane. Depending on the amount of dither added to the true color, the sum of the dither and the true color will be truncated to various ones of the eight grid points. Thus, the ordered dither process can map a pixel to the displayable palette colors located at any one of the eight grid points adjacent to the pixel's true color.

In some cases, the eight grid points adjacent to the true color of a pixel are not all within the color gamut 10. For example, the grid points on the plane 40 adjacent to a true color located at a point 64 next to a border 66 of the color gamut 10 and between the plane 40 and the next higher plane include the grid points 46, 47 within the color gamut 10 and the grid points 68, 69 outside the color gamut 10. Since the grid points 68, 69 are adjacent to the true color, the ordered dither process will sometimes map a pixel with the true color to the color at one of the grid points 68, 69. Since colors located at the grid points 68, 69 are outside the color gamut 10, they are not displayable and cannot be used for the pixel in reproducing the image. For this reason, the colors at grid points outside the color gamut 10 are not included in the displayable color palette.

In the preferred embodiment of the invention, the colors on the borders of the color gamut 10 which are nearest to the grid points outside the color gamut 10 to which a true color can be mapped by the ordered dither process are also included in the displayable palette. For example, the colors located at points 74, 75 on the border 66 of the color gamut 10 nearest to the grid points 68, 69 are included in the displayable palette. (The points 74, 75 are illustrated in FIG. 2 as being on the plane 40 for purposes of illustration only. The points 74, 75 nearest the grid points 68, 69 are actually slightly above the plane 40 since the color gamut 10 widens above the plane 40 and narrows below the plane 40.)

Figure 7:
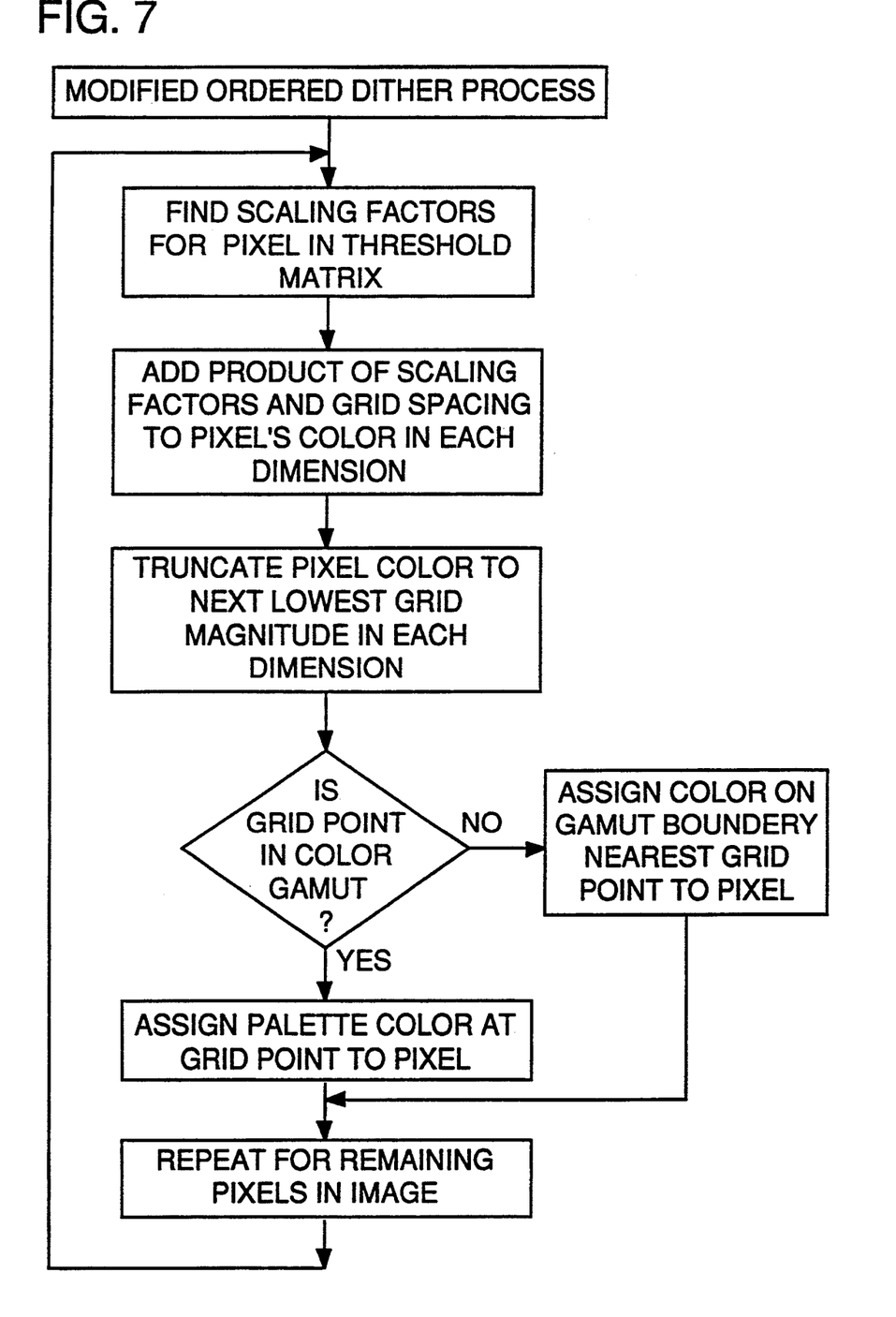
FIG. 7 is a flow chart illustrating a modified ordered dither process according to a preferred embodiment of the invention.

The ordered dither process used to reproduce the image can then be modified to always map the image's pixels to displayable palette colors within the color gamut 10. The modification comprises adding the following step. When the ordered dither process maps a pixel's true color to a color at a grid point outside the color gamut 10, the pixel is mapped instead to the displayable palette color on the border of the color gamut 10 nearest the grid point. For example, when the ordered dither process maps the true color of a pixel to the color at the grid point 68 outside the color gamut 10, the pixel is mapped instead to the displayable palette color at the point 74. This modified ordered dither process is summarized by the flow chart depicted in FIG. 7.

The ordered dither process requires knowledge of the position in the YUV color model 26 of each pixel's true color. Therefore, in the preferred embodiment of the invention, the 24-bit color value associated in the image's bitmap with each pixel preferably specifies a YUV coordinate location (8-bits for each of the Y, U and V coordinates) of the pixel's true color. However, for bitmapped images whose color values specify the true color of pixels using coordinates of another color model (or which indirectly indicate the true color through a CLUT table) can be transformed to 24-bit YUV coordinates before performing the ordered dither process for the pixel. For example, the color values of a bitmapped image which are RGB coordinates of the pixels' true colors can be transformed to YUV coordinates according to the following equations.

$$Y = 0.30 \cdot R + 0.59 \cdot G + 0.11 \cdot B \qquad (2)$$

$$U = \frac{B - Y}{2.03} \qquad (3)$$

-continued $$V = \frac{R - Y}{1.14} \qquad (4)$$

Figure 5:
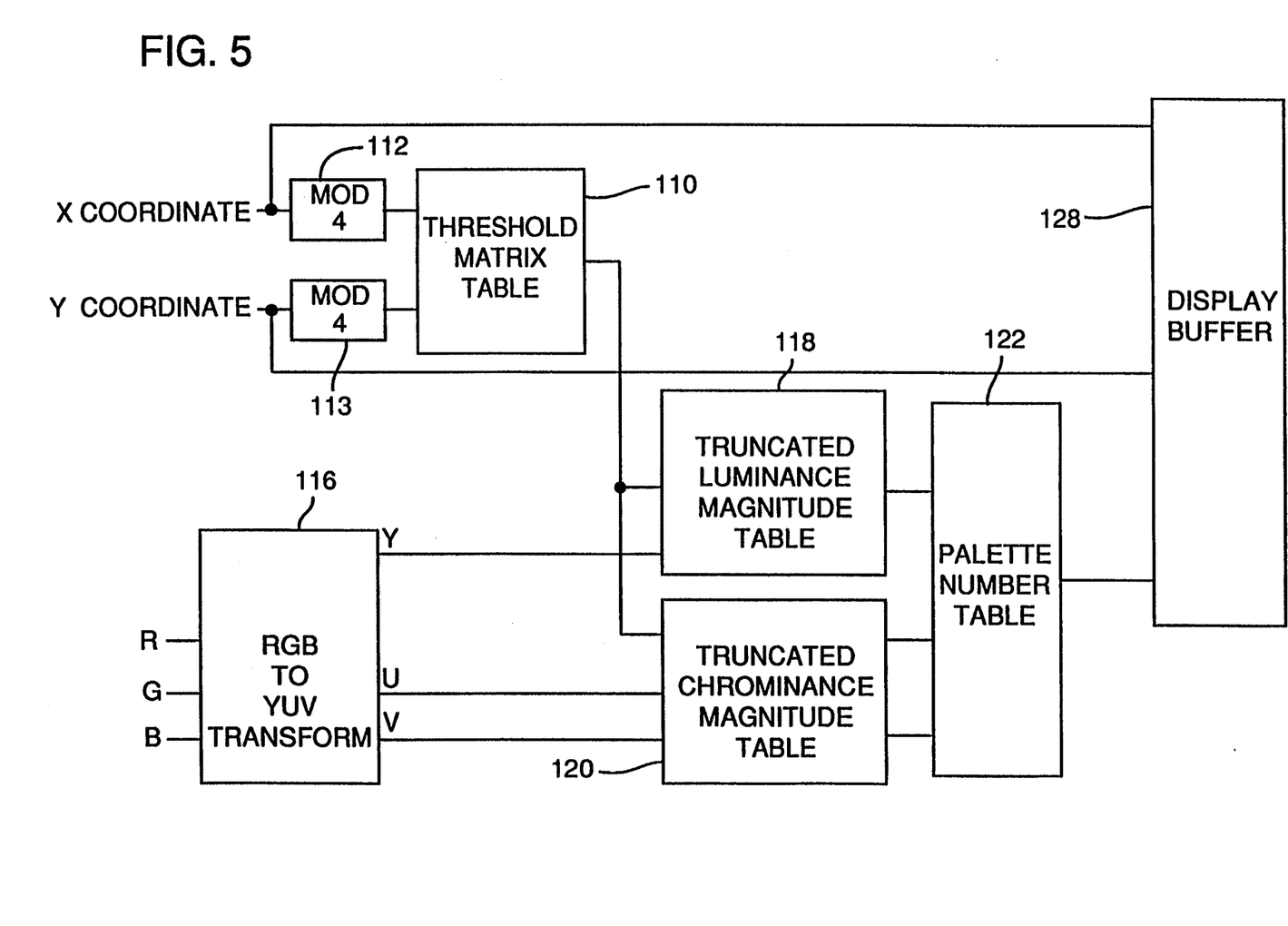
FIG. 5 is a schematic diagram showing the use of pre-calculated tables, including truncated magnitude tables and a palette number table, in accordance with the preferred embodiment of the invention.
Figure 6:
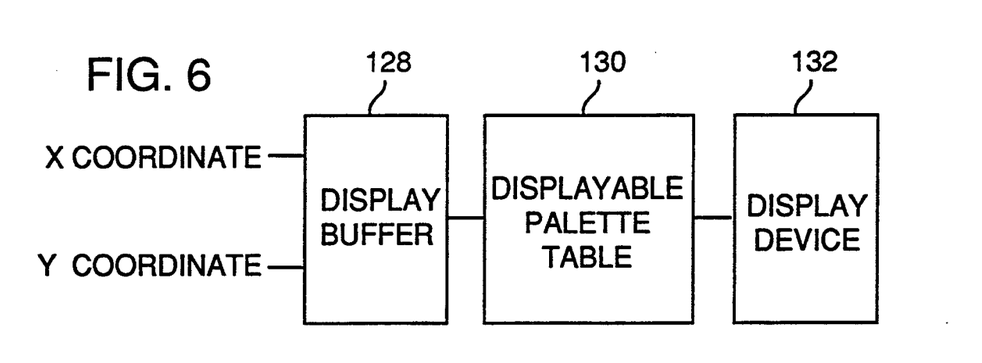
FIG. 6 is a schematic diagram further showing the use of pre-calculated tables, including a displayable palette table, in accordance with the preferred embodiment of the invention.

The ordered dither process is performed more efficiently in the preferred embodiment using precalculated tables as shown in FIGS. 5 and 6. For example, assuming a pixel of a color image has coordinates X and Y, and a 24-bit RGB true color value, a scaling factor for the ordered dither process on the pixel is located in a threshold matrix table 110 using the results of a mod-4 function performed on the X and Y coordinates at blocks 112—113 as indexes. YUV luminance and chrominance values of the pixel are determined at block 116 from the pixel's RGB color value as described in the paragraph above.

After locating the pixel's scaling factor in the threshold matrix table 110, the scaling factor and Y luminance magnitude are used to index an entry in a table 118 of precalculated truncated luminance magnitudes. Each entry in the table 118 contains a truncated luminance magnitude for the scaling factor and Y luminance magnitude which index that entry. Since the Y luminance magnitude is eight bits and there are only sixteen different scaling factors in the threshold matrix, the luminance magnitude table has 4096 entries. Truncated U and V chrominance magnitudes for the pixel are similarly found in a separate chrominance magnitude table 120. (Only one table of truncated chrominance magnitudes need be provided because the grid points are distributed identically and uniformly in both the U and V dimensions.) The truncated luminance and chrominance magnitudes are combined to form an index into a palette number table 122. Each entry in the palette number table 122 contains a 12-bit value (the numbers 0 to 4095) which is associated one to one with a displayable palette color. The palette number indexed by the pixel's truncated luminance and chrominance magnitudes is associated with the displayable palette color to which the pixel is mapped. The indexed palette number for the pixel is generally stored in a display buffer 128 at a location indexed by the pixel's X and Y coordinates.

With reference to FIG. 6, yet another table, a displayable palette table 130, associates the 12-bit values of the displayable palette colors with their color model coordinates. The color model coordinates of the pixel's displayable palette color may be used by the display device for reproducing the pixel.

The present invention including the ordered dither process, displayable palette table, and other tables can be implemented in an electronic circuit such as in an integrated chip on a display adapter card, such as may be used in the output device 14 of the computer system 8 in FIG. 4. Equivalently, the invention can be implemented in software form in an operating system, an application program, 8 or a display driver. When implemented in software, the described methods are performed by circuitry within the computer system 8 such as the microprocessor circuit 9.

In view of the wide variety of embodiments to which the principles of our invention can be applied, it should be apparent that the detailed embodiments are illustrative only and should not be taken as limiting the scope of our invention. Rather, we claim as our invention all such modifications as may come within the scope and spirit of the following claims and equivalents thereto.

We claim:

1. A method for reproducing a color image at a reduced resolution, comprising:
   providing a reduced resolution color palette comprising:
   a plurality of palette colors distributed in the form of a grid within a color gamut;
   the color gamut having a luminance axis extending from black to white, a second axis perpendicular to the luminance axis, and a third axis perpendicular to both the luminance axis and the second axis;
   the grid being formed by the intersections of three sets of planes;
   a first of the three sets being a plurality of planes each perpendicular to the luminance axis, a second of the three sets being a plurality of planes perpendicular to the second axis, a third of the three sets being a plurality of planes perpendicular to the third axis;
   the palette colors being located at the intersections of the three sets;
   assigning a color in said color palette to each pixel in the color image; and
   reproducing the color image in a visually perceptible form using the assigned colors of said color palette.

2. The method of claim 1 wherein the planes in the second and third sets are uniformly spaced and the planes in the first set are spaced nonuniformly.

3. The method of claim 2 wherein the spacing between planes in the first set is at a minimum near black and increases progressively towards white.

4. The method of claim 3 wherein the spacing between planes in the first set is characterized by a cubic function of an algebraic progression.

5. The method of claim 2 further comprising:
   a plurality of palette colors located on a border of the color gamut and nearest to bordering points of the grid;
   the bordering grid points being outside the color gamut and adjacent to colors inside the color gamut.

6. An apparatus for reproducing color images at a lower color resolution, comprising:
   a first palette comprising a plurality of palette colors;
   a memory for storing a color image as an array of pixels, the pixels being associated with color values in the first palette;
   a second palette having a lower color resolution than the first palette and comprising a plurality of palette colors located at the intersections of three sets of planes, each set of planes being perpendicular to the other sets, a first of the three sets being perpendicular to a luminance axis between black and white in a color gamut;
   a processor for reading the first palette color values associated with the pixel of the stored image from the memory and for ordered dithering the first palette color values to associate palette colors in the second palette with the pixels; and
   an output device for reproducing the color image in a visually perceptible form with each pixel of the color image associated with a palette color in the second palette.

7. The apparatus of claim 6 wherein the second palette comprises a color look-up table which associates each palette color of the second palette with a color value.

8. The apparatus of claim 6 wherein the second palette further comprises a plurality of palette colors located on a border of the color gamut and nearest to bordering intersections of the three sets of planes, the bordering intersections being outside the color gamut and adjacent to colors inside the color gamut, the processor further being operative to associate the palette colors on the border of the color gamut with those pixels which ordered dithering would map to colors at the bordering intersections.

9. A method of approximating a color image using a lower color resolution, comprising:
   selecting a mapping color for a pixel in the image; and
   reproducing the image with the pixel having the mapping color,
   the step of selecting comprising ordered dithering a first, high resolution color associated with the pixel to a second color in a reduced resolution palette, the reduced resolution palette comprising a plurality of palette colors located at intersections of three sets of planes within a color gamut, each set of planes being perpendicular to the other sets, a first of the three sets being perpendicular to a luminance axis between black and white in a color gamut.

10. The method of claim 9 further comprising:
    selecting mapping colors for a plurality of additional pixels in the image, the step of selecting comprising ordered dithering a high resolution color associated with each of the additional pixels to colors in the reduced resolution palette; and
    reproducing the image with the additional pixels having their respective selected mapping colors.

11. The method of claim 9 wherein the reduced resolution palette further comprises a plurality of colors on a border of the color gamut and nearest to intersections of the three sets of planes located outside of and adjacent to the color gamut.

12. The method of claim 11 wherein the step of selecting further comprises:
    when a high resolution color associated with a pixel is ordered dithered to a color located at an intersection of the three sets of planes which is outside the color gamut, selecting a color of the reduced resolution palette which is located on a border of the color gamut and nearest to the intersection as the mapping color of the pixel; and
    when the high resolution color associated with the pixel is ordered dithered to a reduced resolution palette color located within the color gamut, selecting the reduced resolution palette color as the mapping color of the pixel.

13. The method of claim 9 wherein the step of reproducing comprises reproducing the color image in visually perceptible form.

* * * * *

UNITED STATES PATENT AND TRADEMARK OFFICE
CERTIFICATE OF CORRECTION

PATENT NO. : 5,398,120
DATED : March 14, 1995
INVENTOR(S) : Steven J. Friedman, et al.

It is certified that error appears in the above-indentified patent and that said Letters Patent is hereby corrected as shown below:

Col. 9, line 64, change "Y=0.30.R+0.59.G+0.11.B" to --Y+0.0.●R+0.59●G+0.11●B--.

Signed and Sealed this

Twenty-seventh Day of February, 1996

Attest:

BRUCE LEHMAN

Attesting Officer     Commissioner of Patents and Trademarks